United States Patent [19]

Inayoshi et al.

[11] 4,111,898

[45] Sep. 5, 1978

[54] PROCESS FOR PRODUCTION OF RESIN COMPOSITIONS WITH EXCELLENT PLATING PROPERTIES

[75] Inventors: Akio Inayoshi; Toshimichi Ito, both of Sodegaura; Kikuo Nagatoshi, Kisarazu; Toshihide Nara, Sodegaura; Shinsuke Sagata, Sodegaura; Hitomi Tomari, Sodegaura; Noriki Fujimoto, Sodegaura; Hidehiko Kaji, Sodegaura, all of Japan

[73] Assignee: Idemitsu Kosan Company, Ltd., Tokyo, Japan

[21] Appl. No.: 845,537

[22] Filed: Oct. 26, 1977

[30] Foreign Application Priority Data

Oct. 30, 1976 [JP] Japan .................................. 51-130039
Oct. 30, 1976 [JP] Japan .................................. 51-130040

[51] Int. Cl.$^2$ ........................ C08J 3/20; C08F 255/00; C08F 279/02

[52] U.S. Cl. ............................... 260/42.53; 260/42.42; 260/878 R

[58] Field of Search .............. 260/42.42, 42.53, 878 R

[56] References Cited

U.S. PATENT DOCUMENTS

| | | | |
|---|---|---|---|
| 3,694,522 | 9/1972 | Tsuruta et al. .................. | 260/878 R |
| 3,821,158 | 6/1974 | Westermann et al. ............ | 260/42.53 |
| 3,928,687 | 12/1975 | Wada et al. ....................... | 260/878 R |
| 3,998,909 | 12/1976 | Roberts et al. ................... | 260/878 R |

*Primary Examiner*—Alan Holler
*Attorney, Agent, or Firm*—Flynn & Frishauf

[57] ABSTRACT

A process for producing a resin composition having excellent plating properties comprising heating a mixture consisting substantially of 100 parts by weight of a polyolefin resin, 5 to 150 parts by weight of an inorganic filler, 1 to less than 20 parts by weight of a liquid rubber, 0.1 to 10 parts by weight of an unsaturated carboxylic acid and 0.001 to 10 parts by weight of a radical generator at 110° to 280° C. in the absence of solvents.

5 Claims, No Drawings

PROCESS FOR PRODUCTION OF RESIN COMPOSITIONS WITH EXCELLENT PLATING PROPERTIES

RELATED APPLICATIONS

This application is related to applications U.S. Ser. No. 774,202, filed Mar. 3, 1977, and U.S. Ser. No. 782,018, filed Mar. 28, 1977.

BACKGROUND OF THE INVENTION

1. Field of the Invention

The present invention relates to a process for the production of resin compositions having excellent plating properties.

2. Description of the Prior Art

Various procedures have hitherto been known to produce polyolefin resin articles with plating properties. These procedures are classified into a method in which a modifying material capable of making polyolefin resins platable is added thereto, and a method in which special pre-treatments are applied.

The former group includes a method in which an inorganic filler is compounded with a polyolefin resin, a method in which an elastomer is blended with a polyolefin resin, and a method in which both the inorganic filler and elastomer are added. In these methods, plate adhesion is increased by the anchor effect resulting from chemical etching.

Polyolefin resins with an inorganic filler alone incorporated therein, however, are insufficient in their adhesion properties although they can easily be coarsened. Therefore, a large amount of filler is needed for increasing adhesion properties, resulting in deterioration of the appearance of a plated product. The method of blending elastomers suffers from disadvantages in that a large amount of elastomer is required to be blended, and in that it is difficult to disperse them in the form of fine particles of less than $1\mu$. As a result, the appearance of a plated product is inevitably deteriorated.

SUMMARY OF THE INVENTION

Accordingly, the principal object of the present invention is to provide a process for the production of polyolefin resin compositions which eliminate the above-described defects of conventional polyolefin resin compositions, and which can be utilized for production of a plated article with high adhesion properties and good appearance by the use of an apparatus for plating an ABS resin as it is.

The present invention provides a process for producing resin compositions having excellent plating properties which comprises kneading a mixture consisting essentially of 100 parts by weight of a polyolefin resin, from 5 to 150, and preferably 10 to 100, parts by weight of an inorganic filler, from 1 to less than 20, and preferably 2 to 15, parts by weight of a liquid rubber, from 0.1 to 10, and preferably 0.2 to 5, parts by weight of an unsaturated carboxylic acid, and from 0.001 to 10, and preferably 0.01 to 1.0, parts by weight of a radical generator, with heating in the absence of solvents.

DETAILED DESCRIPTION OF THE INVENTION

Any polyolefin resin can be used in the method of the present invention. Suitable examples include: monoolefin polymers such as low density polyethylene, medium density polyethylene, high density polyethylene, polypropylene, polybutene-1 and poly-4-methylpentene-1; copolymers such as ethylene-propylene copolymers and ethylene-butene copolymers; and mixtures thereof.

Inorganic fillers which can be used in the present invention include: alumina, zinc white, magnesium oxide, calcium carbonate, talc, clay, silica, kieselguhr, mica, calcium sulfite, calcium sulfate, barium sulfate, titanium oxide, calcium silicate, glass powder, glass fiber, asbestos, gypsum fiber and mixtures thereof. The inorganic filler is not especially limited in its shape and size. When it is in particle form, the average particle size is preferably not more than 10 microns. The amount of the inorganic filler added is from 5 to 150 parts by weight per 100 parts by weight of the polyolefin resin, taking into account the balance of factors including plating properties, mechanical strength and moldability. When the amount of inorganic filler is less than 5 parts by weight, the coarsening effect resulting from etching is insufficient; whereas, with above 150 parts by weight, problems are caused in workability and moldability and, in addition, excessive surface coarsening is undesirably caused.

Liquid rubbers used in the present invention are those polymers comprised mainly of diene monomers and having a number average molecular weight of from 500 to 10,000. Those polymers which are fluid at room temperature are preferred.

Representative examples of these liquid rubbers include: 1,2-polybutadiene, 1,4-polybutadiene, polyisoprene, polychloroprene, 1,2-polypentadiene, styrene-butadiene copolymers, acrylonitrile-butadiene copolymers, butadiene-isoprene copolymers, and butadiene-pentadiene copolymers, each of which has a number average molecular weight of from 500 to 10,000; liquid rubbers containing a functional group such as a hydroxy group, a carboxyl group, a mercapto group, a halogen atom, an amino group, an aziridino group and an epoxy group; unsaturated dicarboxylic acid half esters of terminal hydroxylated 1,2-polybutadiene or 1,4-polybutadiene; a heat-decomposed rubber; an ozone-decomposed rubber; and mixtures thereof.

The amount of liquid rubber added is, as described above, in a range of from 1 to less than 20 parts by weight. If the amount is below 1 part by weight, the adhesion properties of a metal coating in plating are insufficient; whereas, if the amount is 20 or more parts by weight, etching proceeds excessively, and the surface of a plated product is undesirably roughened. The liquid rubber acts as a plasticizer for a polyolefin resin, providing a good mold having less mold deformation and suitable for plating. In addition, it is considered that the liquid rubber combines with the polyolefin resin and an unsaturated carboxylic acid to increase the strength of the resulting resin composition.

Unsaturated carboxylic acids used in the present invention include: maleic acid, nudic anhydride, itaconic acid, citraconic acid, crotonic acid, isocrotonic acid, mesaconic acid, angelic acid, sorbic acid, acrylic acid, maleic anhydride, itaconic anhydride, and citraconic anhydride, and such are preferred. When the amount of unsaturated carboxylic acid added is less than 0.1 part by weight, the adhesion properties of a plate coating obtained are low, and the effect of adding the unsaturated carboxylic acid is not obtained. On the other hand, with addition of more than 10 parts by weight of the unsaturated carboxylic acid, appearance of a product deteriorates.

Any radical generator can be used in the present invention provided that it accelerates the reaction among the polyolefin resin, the liquid rubber and the unsaturated carboxylic acid. For example, benzoyl peroxide, lauryl peroxide, azobisisobutylonitrile, cumene peroxide, dicumyl peroxide, t-butylhydroperoxide, $\alpha,\alpha'$-bis(t-butylperoxydiisopropyl)benzene, di-t-butyl peroxide, and 2,5-di(t-butylperoxy)hexane are preferably used. When the amount of the radical generator added is less than 0.001 part by weight, the reaction between the polyolefin resin and the liquid rubber and unsaturated carboxylic acid proceeds insufficiently; whereas, when the amount is more than 10 parts by weight, no additional effect can be obtained.

In addition to the above-described components, if necessary, a material such as a colorant, a stabilizer, a plasticizer and a lubricant can be added.

A resin composition of the present invention is prepared by kneading a mixture consisting essentially of the above components with heating at a temperature of from 110 to 280° C. in the absence of solvents. In a preferred embodiment, the above components — except for the inorganic filler — are mixed and reacted in suitable apparatus including a mixing roll, Banbury Mixer, extruder and a continuous kneader, while heating the components at a temperature as high as from 110° to 280° C. to produce a modified polyolefin resin. The resulting modified polyolefin resin and the remaining inorganic filler are mixed and heated at the above temperatures to obtain the desired resin composition of the present invention. The resulting resin composition is molded and plated.

For example, application of plating processings usually employed for plating ABS resins, i.e., degreasing, chemical etching using a mixed solution of chromic acid and sulfuric acid, dipping in a solution of stannous chloride to provide sensitivity, activation using a palladium chloride solution, chemical plating and electroplating, provide a plated product having good adhesion properties of a metal coating and good appearance.

The resin composition of the present invention per se can be plated with plating apparatus used for an ABS resin. In addition, articles having strong adhesion between the resin and plating coating, and having excellent appearance can be obtained. Therefore, the resin compositions of the present invention find wide applications, such as in automobile parts, electric appliances, and miscellaneous goods.

The following examples and comparative examples are given to illustrate the present invention in more detail.

EXAMPLE 1

To 100 parts by weight of a block copolymer of ethylene and propylene (MI=9 grams/10 min., $d$=0.91 grams/cm$^3$.) were added 3 parts by weight of a terminal hydroxylated 1,4-polybutadiene (number average molecular weight: 3,000; viscosity: 50 poises/30° C.; OH group content: 0.83 milliequivalent/gram) as a liquid rubber, 1 part by weight of maleic anhydride as an unsaturated carboxylic acid and 0.022 part by weight of $\alpha,\alpha'$-bis(t-butylperoxydiisopropyl)benzene as a radical generator. The resulting mixture was reacted by kneading it in a Banbury Mixer at a temperature of from 180° to 210° C. for 4 minutes to form a modified polypropylene. Thereafter, 100 parts by weight of the modified polypropylene and 67 parts by weight of talc (average particle size, 4.2$\mu$) were mixed, and the resulting mixture was kneaded at 190° C. for 4 minutes in the mixer.

The mixture so obtained was pelletized and injected into an In-line Screw Type Injection Machine (5 oz.: mold pressure: 150 kilogram/cm$^2$G) to form a plate of a thickness of 3 millimeters, a length of 125 millimeters and a width of 63 millimeters.

The plate was plated according to plating processing usually employed for an ABS resin. That is, the plate was degreased and dipped in a chemical etching solution (70° ± 5° C.) for 15 minutes to effect chemical etching, the chemical etching solution being prepared by adding potassium dichromate (15 grams per liter of aqueous solution) to an aqueous solution comprising 60 vol. % of sulfuric acid, 10 vol. % of phosphoric acid and 30 vol. % of water. The plate was then dipped in a stannous chloride solution at room temperature for 5 minutes to sensitize it, and it was then dipped in a palladium chloride solution at room temperature for 2 minutes to activate it. The plate was then subjected to chemical nickel plating. Thereafter, semi-lustrous nickel plating and lustrous nickel plating, and chrome plating were applied by electroplating.

The thickness of a plating film of a plated product was less than about 25 microns. With the thus-obtained plated product, the appearance was measured with the eye, the scotch peeling test of a plate film was conducted using a cellophane tape, the peeling of the plate film resulting from the bending breakage of the plated product was measured, and a boiling resistance test was conducted. This boiling resistance test was carried out as follows: the plated product was dipped in water for 2 hours and then in ice water at 0° C. for 20 minutes. This cycle was repeated four times and then a change in variation of the surface state was observed. The results obtained are shown in Table 1.

EXAMPLE 2

The procedure of Example 1 was repeated, with the exception that the amount of liquid rubber added was 7 parts by weight and the amount of unsaturated carboxylic acid added was 2 parts by weight. The results obtained are shown in Table 1.

EXAMPLE 3

The procedure of Example 1 was repeated, with the exception that a propylene homopolymer (MI=9 grams/10 min., $d$=0.91 grams/cm$^3$.) was used in place of the ethylene-propylene copolymer, and the amount of inorganic filler added was 43 parts by weight. The results obtained are shown in Table 1.

EXAMPLE 4

The procedure of Example 1 was repeated, with the exception that 0.5 part by weight of itaconic acid as an unsaturated carboxylic acid was used, and 67 parts by weight of calcium carbonate (average particle size: 2.8$\mu$) were used as an inorganic filler. The results obtained are shown in Table 1.

COMPARATIVE EXAMPLE 1

A mixture of 100 parts by weight of ethylene-polypropylene copolymer and 67 parts by weight of talc, each being the same as used in Example 1, was heated, kneaded, molded and plated in the same manner as in Example 1. The plated product obtained was measured in various respects, and the results obtained are shown in Table 2.

COMPARATIVE EXAMPLE 2

To a composition used in Comparative Example 1 were added 5 parts by weight of the terminal hydroxylated 1,4-polybutadiene described in Example 1 as a liquid rubber. The resulting mixture was molded and plated in the same manner as in Example 1. The results obtained are shown in Table 2.

COMPARATIVE EXAMPLE 3

To a composition used in Comparative Example 2 was added 0.5 part by weight of maleic anhydride as an unsaturated carboxylic acid. The resulting mixture was molded and plated in the same manner as in Example 1. The results obtained are shown in Table 2.

COMPARATIVE EXAMPLE 4

To 100 parts by weight of the propylene homopolymer described in Example 3 were added 3 parts by weight of a terminal hydroxylated 1,2-polybutadiene (number average molecular weight: 2,000; specific gravity: 0.88; flow-point: 17° C.), 1 part by weight of acrylic acid and 0.05 part by weight of dicumyl peroxide. The resulting mixture was heated, kneaded, molded and plated in the same manner as in Example 1. The results obtained are shown in Table 2.

COMPARATIVE EXAMPLE 5

The procedure of Example 1 was repeated, with the exception that the amount of liquid rubber added was 20 parts by weight, and a plated product was thus obtained. The results obtained are shown in Table 2.

Table 1

| Example | A | B | C | D |
|---|---|---|---|---|
| 1 | Good | 100/100 | No | No Change |
| 2 | Good | 100/100 | No | No Change |
| 3 | Good | 100/100 | No | No Change |
| 4 | Good | 100/100 | No | No Change |

A: Appearance of Plated Product
B: Scotch Peeling Test using Cellophane Tape
C: Peeling owing to Bending
D: Boiling Resistance Test.

Table 2

| Comparative Example | A | B | C | D |
|---|---|---|---|---|
| 1 | Good | 10/100 | Peeled | Swollen, Peeled |
| 2 | Good | 30/100 | Peeled | Swollen, Peeled |
| 3 | Good | 25/100 | Peeled | Swollen |
| 4 | Swollen | 0/100 | Peeled | Swollen, Peeled |
| 5 | Pear-skin | 100/100 | No | Slightly Swollen |

A, B, C, D: The same as in Table 1.

EXAMPLE 5

A mixture of 100 parts by weight of a block copolymer of ethylene and propylene (MI=9 grams/10 min.; $d=0.91$ grams/cm$^3$.) and 67 parts by weight of talc (average particle size: 4.2μ) was prepared. To 100 parts by weight of the mixture were added 3 parts by weight of the terminal hydroxylated 1,4-polybutadiene described in Example 1 as a liquid rubber, 0.5 part by weight of maleic anhydride as an unsaturated carboxylic acid and 0.022 part by weight of α,α'-bis(t-butylperoxydiisopropyl)benzene as a radical generator. The thus-obtained mixture was then reacted by kneading it in a Banbury Mixer at 180° to 210° C. for 4 minutes.

Thereafter, the resulting mixture was pelletized and injected into an In-line Screw Type Injection Machine (5 oz., mold pressure 150 kilogram/cm$^2$G) to form a plate of a thickness of 3 millimeters, a length of 125 millimeters and a width of 63 millimeters.

The plate so obtained was plated according to plating processing usually employed for an ABS resin, that is, the plate was degreased, etched chemically, sensitized, activated and nickel-plated through to electroplating, all as described in Example 1.

The thickness of a plating film of the plated product was about 25μ. The plated product was tested as described in Example 1.

EXAMPLE 6

Reaction, molding and plating were carried out by the same procedure as employed in Example 5, with the exception that the amount of the terminal hydroxylated 1,4-polybutadiene added was 5 parts by weight, and the amount of maleic anyhydride added was 2 parts by weight. The results are shown in Table 3.

EXAMPLE 7

The procedure of Example 5 was repeated, with the exception that the amount of talc added was 100 parts by weight, and a plated product was thus obtained. The results are shown in Table 3.

EXAMPLE 8

The procedure of Example 5 was repeated, with the exception that the propylene homopolymer described in Example 3 was used in place of the ethylene-propylene block copolymer, and a plated product was thus obtained. The results obtained are shown in Table 3.

EXAMPLE 9

The procedure of Example 5 was repeated, with the exception that 3 parts by weight of a terminal carboxylated 1,2-polybutadiene (number average molecular weight: 2,000; 1,2-bond content: 90%; specific gravity: 0.89; flow-point: 20° C.) were used as a liquid rubber, and a plated product was thus obtained. The results obtained are shown in Table 3.

EXAMPLE 10

The procedure of Example 5 was repeated, with the exception that 0.5 part by weight of itaconic acid was used as an unsaturated carboxylic acid, and a plated product was thus obtained. The results obtained are shown in Table 3.

EXAMPLE 11

The procedure of Example 5 was repeated, with the exception that 43 parts by weight of calcium carbonate (average particle size: 2.8μ) were used in place of the talc as an inorganic filler, and a plated product was thus obtained. The results obtained are shown in Table 3.

EXAMPLE 12

The procedure of Example 5 was repeated, with the exception that 0.05 part by weight of dicumyl peroxide was used as a radical generator, and a plated product was thus obtained. The results obtained are shown in Table 3.

EXAMPLE 13

The procedure of Example 5 was repeated, with the exception that polyethylene (MI=6.0 grams/10 min.; $d=0.968$ grams/cm$^3$) was used in place of the ethylene-propylene copolymer, and a plated product was thus obtained. The results obtained are shown in Table 3.

COMPARATIVE EXAMPLE 6

A mixture of 100 parts by weight of ethylene-propylene block copolymer and 67 parts by weight of talc, each the same as used in Example 5, was heated, kneaded and molded in the same manner as in Example 5. The resulting mold was plated in the same manner as in Example 5. With the thus-obtained plated product, the measurements were conducted in various respects and the results obtained are shown in Table 4.

COMPARATIVE EXAMPLE 7

To the composition used in Comparative Example 6 were added 5 parts by weight of the terminal hydroxylated 1,4-polybutadiene described in Example 5 as a liquid rubber. The resulting mixture was molded and plated in the same manner as in Example 5. The results obtained are shown in Table 4.

COMPARATIVE EXAMPLE 8

To the composition used in Comparative Example 7 was added 0.5 part by weight of maleic anhydride as an unsaturated carboxylic acid. The resulting mixture was molded and plated in the same manner as in Example 5. The results obtained are shown in Table 4.

COMPARATIVE EXAMPLE 9

To the composition of comparative Example 7 was added 0.022 part by weight of α,α'-bis(t-butylperoxydiisopropyl)benzene as a radical generator. The resulting mixture was molded and plated in the same manner as in Example 5. The results obtained are shown in Table 4.

COMPARATIVE EXAMPLE 10

To the composition of comparative Example 6 were added 0.5 part by weight of itaconic acid and 0.022 part by weight of dicumyl peroxide. The resulting mixture was molded and plated in the same manner as in Example 5. The results obtained are shown in Table 4.

COMPARATIVE EXAMPLE 11

Molding and plating were carried out in the same manner as in Example 5, with the exception that 5 parts by weight of a styrene-butadiene rubber (Mooney viscosity: 52; produced by Japan Synthetic Rubber Co., Ltd.), which was solid at room temperature, was used in place of the terminal hydroxylated 1,4-polybutadiene. The results obtained are shown in Table 4.

COMPARATIVE EXAMPLE 12

To 100 parts by weight of the polypropylene described in Example 3 were added 3 parts by weight of the terminal carboxylated 1,2-polybutadiene described in Example 4, 1 part by weight of maleic anhydride and 0.05 part by weight of α,α'-bis(t-butylperoxydiisopropyl)benzene. The resulting mixture was heated, kneaded, molded and plated in the same manner as in Example 5. The results obtained are shown in Table 4.

COMPARATIVE EXAMPLE 13

The procedure of Example 5 was repeated, with the exception that the amount of liquid rubber added was 20 parts by weight. The results obtained are shown in Table 4.

COMPARATIVE EXAMPLE 14

The procedure of Example 5 was repeated, with the exception that the amount of maleic anhydride added was 15 parts by weight. The results obtained are shown in Table 4.

Table 3

| Example | A | B | C | D |
|---|---|---|---|---|
| 5 | Good | 100/100 | No | No Change |
| 6 | Good | 100/100 | No | No Change |
| 7 | Good | 100/100 | No | No Change |
| 8 | Good | 100/100 | No | No Change |
| 9 | Good | 100/100 | No | No Change |
| 10 | Good | 100/100 | No | No Change |
| 11 | Good | 100/100 | No | No Change |
| 12 | Good | 100/100 | No | No Change |
| 13 | Good | 100/100 | No | No Change |

A: Appearance of Plated Product
B: Scotch Peeling Test Using Cellophane Tape
C: Peeling Owing to Bending
D: Boiling Resistance Test.

Table 4

| Comparative Example | A | B | C | D |
|---|---|---|---|---|
| 6 | Good | 10/100 | Peeled | Swollen, Peeled |
| 7 | Good | 30/100 | Peeled | Swollen, Peeled |
| 8 | Good | 25/100 | Peeled | Swollen |
| 9 | Good | 40/100 | Partly Peeled | Partly Swollen |
| 10 | Good | 30/100 | Peeled | Swollen |
| 11 | Fine Dots Formed | 80/100 | Partly Peeled | Partly Swollen |
| 12 | Swollen | 0/100 | Peeled | Swollen, Peeled |
| 13 | Pear-skin | 100/100 | Not Peeled | Partly Swollen |
| 14 | Pear-skin | 100/100 | Not Peeled | Not Changed. |

Instead of employing solvent in the process of U.S. Ser. Nos. 774,202 and 782,018, in the process of the present invention resin composition is obtained by heating the mixture in the range of from 110° to 280° C. to make it molten. In this connection, compared with the abovementioned prior process, the process of the present invention is simple in operations, and advantageous in the respect of cost. Moreover, the present invention requires no post-treatment such as separating the product from the solvent, or recovering the solvent. Owing to the existence of inorganic filler, the surface of the resin composition makes adequately rough, so that said composition has excellent plating properties.

What is claimed is:

1. A process for producing a resin composition having excellent plating properties which comprises mixing a charge consisting essentially of 100 parts by weight of a polyolefin resin, from 5 to 150 parts by weight of an inorganic filler, from 1 to less than 20 parts by weight of a liquid rubber, from 0.1 to 10 parts by weight of an unsaturated carboxylic acid and from 0.001 to 10 parts by weight of a radical generator with heating at a temperature of from 110° C. to 280° C. in the absence of solvents.

2. The process for producing a resin composition according to claim 1, wherein a mixture consisting essentially of 100 parts by weight of a polyolefin resin, from 1 to less than 20 parts by weight of a liquid rubber, from 0.1 to 10 parts by weight of an unsaturated carboxylic acid and from 0.001 to 10 parts by weight of a radical generator is first reacted by heating at a temperature of from 110° to 280° C. in the absence of solvents to form a modified polyolefin resin; from 5 to 150 parts by weight of an inorganic filler are then added to the modified polyolefin resin; and the resulting mixture is then heated at a temperature of from 110° C. to 280° C.

3. The process for producing a resin composition according to claim 1, wherein the liquid rubber is a polymer composed mainly of diene monomers having a molecular weight of from 500 to 10,000 and fluid at room temperature.

4. The process for producing a resin composition according to claim 1, wherein the unsaturated carboxylic acid is selected from the group consisting of maleic acid, maleic anhydride, nudic anhydride, citraconic acid, crotonic acid, isocrotonic acid, mesaconic acid, itaconic acid, angelic acid, sorbic acid, itaconic anhydride, citraconic anhydride and acrylic acid.

5. The process for producing a resin composition according to claim 1, wherein the radical generator is at least one member selected from the group consisting of benzoyl peroxide, lauroyl peroxide, azobisisobutylonitrile, dicumyl peroxide, $\alpha,\alpha'$-bis(t-butylperoxydiisopropyl)benzene, 2,5-dimethyl-2,5-di(t-butylperoxy)hexane, di-t-butylperoxide, cumene hydroperoxide, and t-butyl hydroperoxide.

* * * * *